United States Patent Office

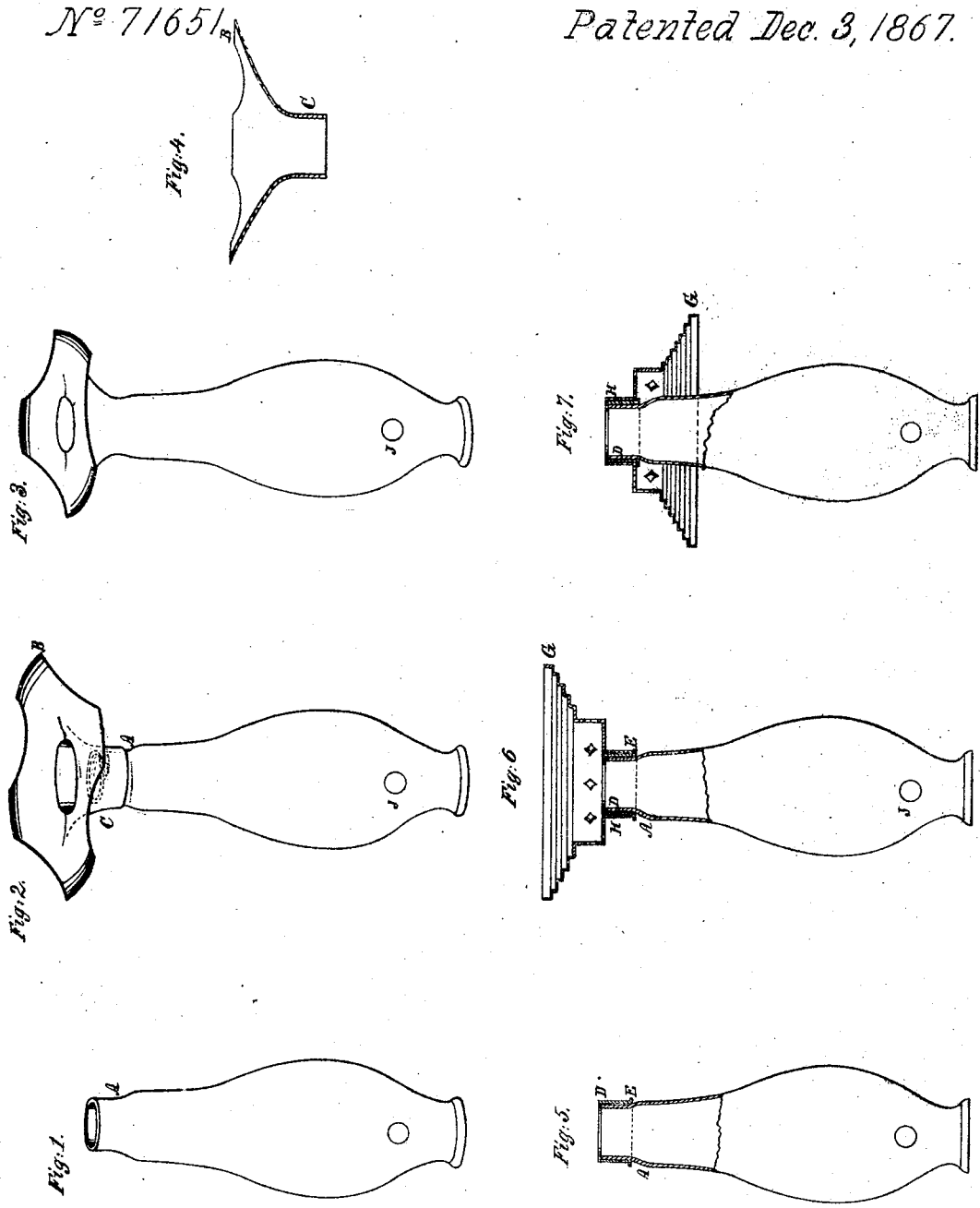

EILERT O. SCHARTAU, OF PHILADELPHIA, PENNSYLVANIA.

*Letters Patent No. 71,651, dated December 3, 1867; antedated November 21, 1867.*

IMPROVEMENT IN LAMP-CHIMNEYS.

*The Schedule referred to in these Letters Patent and making part of the same.*

TO ALL WHOM IT MAY CONCERN:

Be it known that I, EILERT O. SCHARTAU, of the city of Philadelphia, and State of Pennsylvania, have invented an Improved Glass Chimney for Lamps, with flared top; and I do hereby declare the following to be an exact description thereof, reference being had to the accompanying drawings, and to the letters of reference marked thereon, making a part of this specification, in which—

Figure 1 represents a glass chimney with a shoulder or offset, A, at top.

Figure 2 represents a flared top, B, with collar, C, resting upon the shoulder A of the glass chimney.

Figure 3 represents a glass chimney with a flared and scalloped top, in one piece.

Figure 4 represents the detached flared top, as seen at fig. 2.

Figure 5 represents the glass chimney with its shoulder A and a metallic collar, D, with a flange, E, on its lower rim.

Figure 6 represents the glass chimney with its shoulder A, collar D, and metallic top G, flared and corrugated, having a collar, H, to fit over the collar D, and rest upon the flange E. This top G can be used either as a heater or reflector of the light of the lamp, as it is intended to rest upon the flange E in a reverse position, forming a neat shade, or perfect reflector, as shown at Figure 7.

The detached flared tops G and B can be manufactured of any silicious, argillaceous, or metallic substances. The glass chimneys have a round aperture, J, near the lower part, for the purpose of inserting a match, or to light the lamp without removing the chimney, and to give additional draught to the flame of the lamp.

What I claim as my invention, and desire to secure by Letters Patent, is—

The glass chimney with the flared top, whether scalloped or plain on the edge, as herein described.

I also claim the glass chimney having a shoulder formed at the top, for the purpose of permanently attaching a glass or metallic top, as herein described, and for the purposes set forth.

EILERT O. SCHARTAU.

Witnesses:
J. FRANKLIN REIGART,
JOHN S. HOLLINGSHEAD.